No. 826,469. PATENTED JULY 17, 1906.
V. M. BRASCHI.
APPARATUS FOR PRODUCING AND PREPARING CERTAIN ARTICLES OF FOOD.
APPLICATION FILED MAR. 28, 1905.
2 SHEETS—SHEET 1.
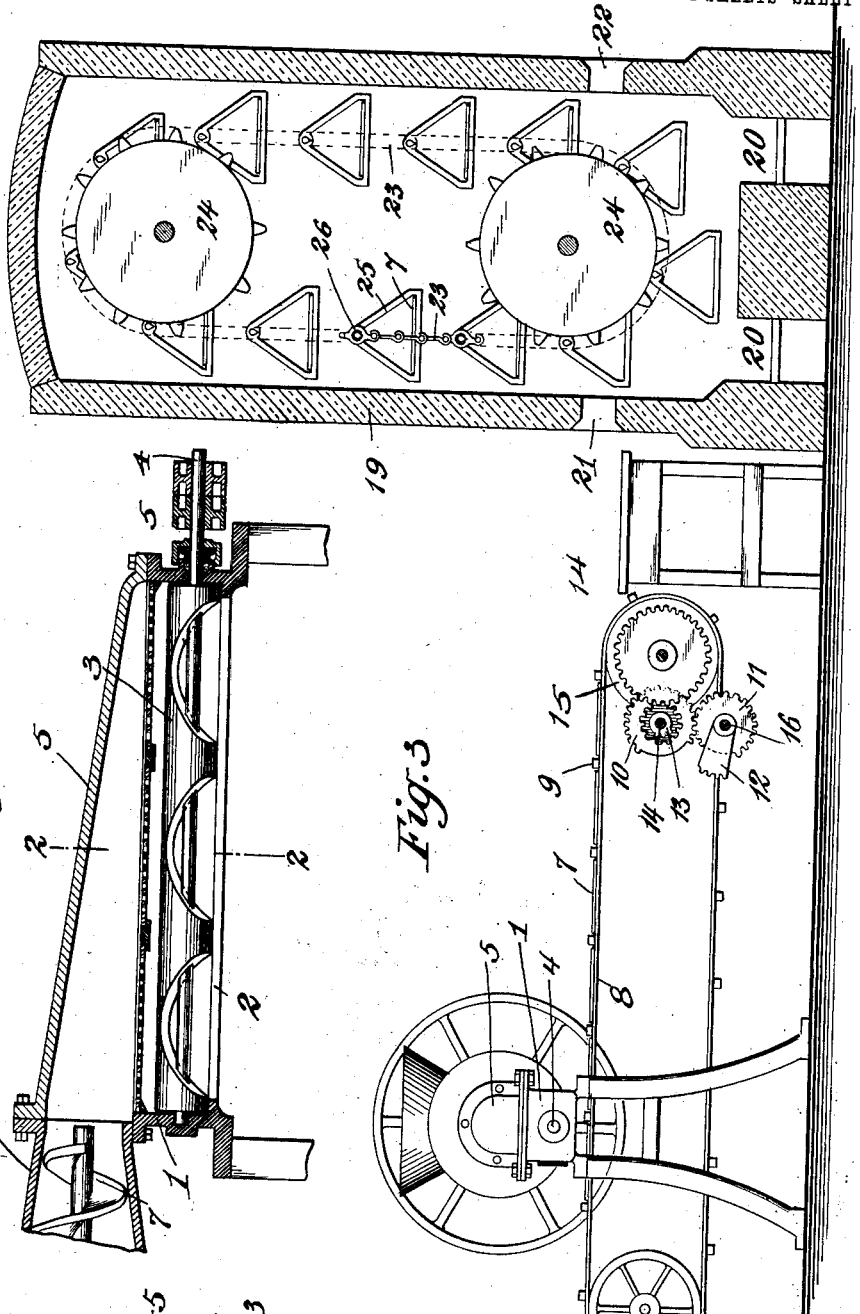
WITNESSES:
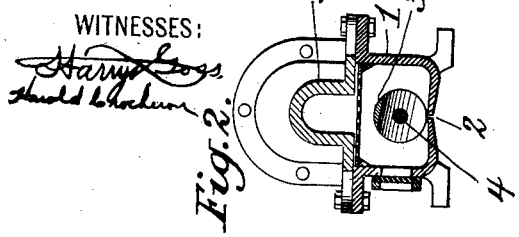
INVENTOR
Victor M. Braschi
BY
Chapin Raymond Marble
his ATTORNEYS No. 826,469. PATENTED JULY 17, 1906.
V. M. BRASCHI.
APPARATUS FOR PRODUCING AND PREPARING CERTAIN ARTICLES OF FOOD.
APPLICATION FILED MAR. 28, 1905.
2 SHEETS—SHEET 2.
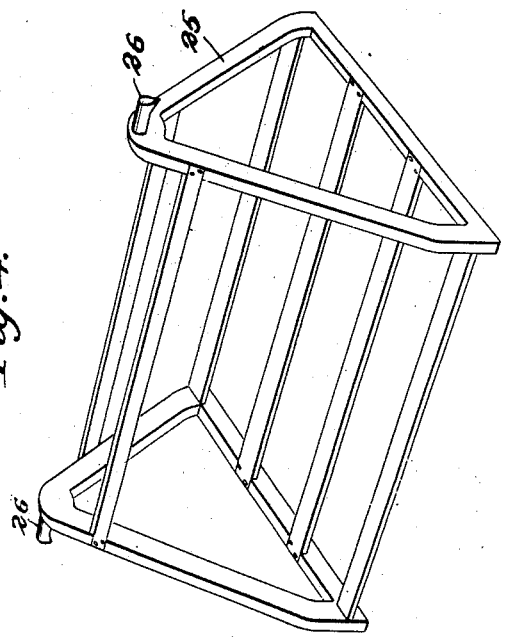
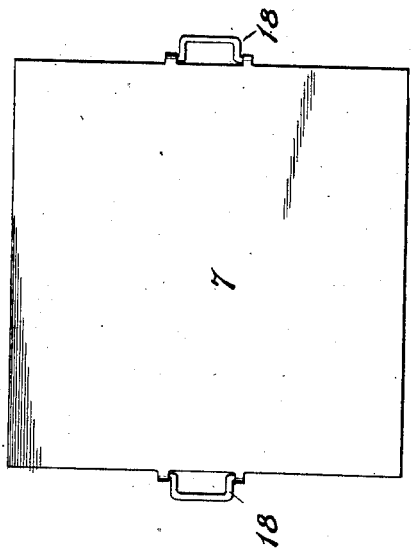
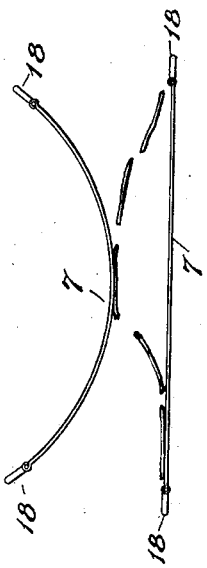
WITNESSES:
INVENTOR
BY
ATTORNEYS
THE NORRIS PETERS CO., WASHINGTON, D. C.

UNITED STATES PATENT OFFICE.

VICTOR M. BRASCHI, OF MEXICO, MEXICO.

APPARATUS FOR PRODUCING AND PREPARING CERTAIN ARTICLES OF FOOD.

No. 826,469.

Specification of Letters Patent.

Patented July 17, 1906.

Application filed March 28, 1905. Serial No. 252,550.

*To all whom it may concern:*

Be it known that I, VICTOR M. BRASCHI, a citizen of the United States of America, and a resident of the city of Mexico, Mexico, have invented certain new and useful Improvements in Apparatus for Producing and Preparing Certain Articles of Food, of which the following is a specification, reference being had to the accompanying drawings, forming a part thereof.

My invention relates to improvements in apparatus for producing and preparing certain articles of food, such as Mexican tortillas.

The tortilla, which is a staple article of food in Mexico, is substantially a griddle-cake composed of Indian corn or maize. In preparing the tortilla Indian corn or maize is soaked in hot water with lime for a length of time sufficient for the grain and hull to be softened, and the mass is then mixed and ground to form a dough. A portion of this dough is formed into a cake about five to six inches in diameter and from one-sixteenth to one-eighth of an inch thick. It is afterward cooked and is then ready for consumption.

Up to recent times the tortilla has always been made by hand and cooked individually by the maker; but recently patents were granted to Romero and Rodriguez y Arce, Nos. 738,242 and 738,243, September 8, 1903, for apparatus for producing and preparing tortillas and the process for forming them. The apparatus comprises a machine for producing tortillas one at a time and delivering them in an endless line upon a belt or conveyer, by which they are conveyed through an open-fire furnace.

In my present invention I provide a form of machine by which a number of tortillas may be delivered simultaneously without thereby duplicating the operating mechanism or complicating the working parts.

I further provide a novel system and arrangement of conveying means for conveying a plurality of the tortillas so produced to the cooking-oven, improved means for operating the same, improved trays for supporting the tortillas, and an improved system of handling the tortillas in the oven, all as will be presently described.

The main objects of my invention are to simplify the production of a plurality of articles at a time, to facilitate the handling of the articles when they are produced, to provide an easy and simple means for turning the articles over so that both sides may be presented for proper cooking in the oven, and to provide for the proper cooking by supporting the articles upon metal trays, so that they are cooked by indirect heat from the furnace and not by direct heat, as in the Romero and Rodriguez y Arce apparatus.

My invention further consists in certain novel details of construction and combination of parts, as will be hereinafter more fully set forth.

I will now proceed to describe an apparatus embodying my invention and will then point out the novel features in claims.

In the drawings, Figure 1 is a view in central longitudinal vertical section of a machine for producing a plurality of tortillas at a time, certain parts of the machine being broken away. Fig. 2 is a view in transverse section therethrough, the plane of section being substantially upon the line 2 2 of Fig. 1. Fig. 3 is a view in side elevation of the machine and a view in central vertical section through a furnace or oven employed in connection therewith. Fig. 4 is a detail view in perspective of one of the tray-carriers employed in the oven. Fig. 5 is a detail view of one of the trays, and Fig. 6 is a detail view showing the method of using the trays when turning the tortillas over.

The machine for producing the tortillas comprises a casing 1, having therein a longitudinal slot or opening 2. Mounted within the casing and with its periphery adjacent the said slot or opening is a forming member 3, comprising a cylinder with portions thereof cut away, said cylinder mounted upon a shaft 4, extending to the exterior of the casing and provided with suitable driving means 5. Above the forming member 3 is a hood 5, extending the entire length of the machine and contracting in cross-sectional area from one end to the other. At its larger end it opens into a tube 6, in which there is a feeding-screw 7, arranged to force material through the hood into the casing 1 and out through the slot 2. The tapering form of the hood tends to properly distribute the material throughout the whole length of the casing, so that it will be uniformly forced through the entire length of the slot when allowed so to do. The extent of opening through the slot is, however, varied by the forming member in its rotation, which covers and uncovers portions of the said slot, whereby forming the material forced therethrough into the desired shape. The several portions of the periphery cut away are in the present instance each of the form of a circle wrapped around the cylinder, so that the shape of the material forced therethrough will be a cylindrical one having a thickness equal to the width of the slot. In a machine of this kind it will be seen that I may multiply the number of articles produced at a single time almost indefinitely by merely lengthening the forming member and casing therefor and providing a suitable number of cut-away portions. There is no duplication of the operating mechanism provided and, in fact, no additional mechanism whatsoever. Thus a machine may be cheaply built to produce as many articles at a time as may be desired. The articles as they are formed drop onto suitable trays 7, supported upon a traveling conveyer 8. The traveling conveyer may be of any suitable form and is preferably provided with transverse spacing-pieces 9 to properly space the trays apart. The tortillas come from the machine in substantially an endless stream equally spaced apart; but the trays being spaced apart, as shown, require that the traveler shall be operated at a higher speed at intervals, so that there be sufficient space provided between the last row of tortillas on one tray and the first row of tortillas on the next succeeding tray. For this purpose I include in the driving mechanism a variable drive, here shown as comprising mutilated gear-wheels 10 and 11 and gear-sectors 12 and 13. The gear 10 and sector 13 are mounted upon a shaft 14, suitably connected by gearing to one of the conveyer-driving wheels 15, while the gear-wheel 11 and sector 12 are mounted upon another shaft 16, suitably driven from a source of power. (Not shown.) The ratio of the gearing is intended to be such that one revolution of the shaft 14 advances the carrier 8 a distance between two of the trays. During the time the trays are beneath the slot 2 the gears 10 and 11 will remain in mesh, so that the carrier will be driven at the required speed. As the end of the tray passes beneath the slot and until another tray reaches a suitable point beneath same the teeth of the sector 12 will be in engagement with the teeth of the sector 13, during which time the carrier will be driven at a higher speed, as will be readily understood, the driving-sector 12 being of larger diameter with respect to the driven sector 13 than is the drive-wheel 11 with respect to the driven wheel 10.

The trays 7 are loosely arranged upon the conveyer, being placed thereon at the rear of the machine by an attendant and removed therefrom in front of the machine by another attendant or in any suitable manner. Fig. 5 is a detail view of one of these trays, which is preferably composed of thin flexible material, such as thin sheet-iron, provided with side handles 18. The handles 18 are preferably pivoted to the edges of the tray, so that the trays may be used either way up impartially.

The oven or furnace comprises an inclosing shell 19, having fire-grates 20 20 and side openings 21 and 22, which may be employed as entrances and exits for the trays of articles to be cooked. Suitably arranged within the furnace-shell is a vertical conveyer 23, mounted upon wheels 24 24 and provided with tray-carriers 25. The tray-carriers 25, of which one is shown in detail in Fig. 4, are preferably supported upon the conveyer-chain 23 by means of knife-blade members 26, whereby they may swing freely, so as to be always maintained in a uniform position as the carrier-chain passes over and under the supporting-wheels 24. The trays after carrying the tortillas delivered from the forming-machine are introduced into the furnace through the opening 21, being placed upon the carrier-trays 25. The conveyer in the furnace is caused to travel continuously or intermittently, as may be desired, the trays carrying the tortillas being heated by the fire below and the tortillas thus baked in the most approved manner. The trays delivered from the conveyer 8 may be stacked up, if desired, or may be introduced directly into the furnace. The cooking of the tortillas may be closely watched by the furnace or oven attendant, and when they are cooked on one side the trays may be removed and inverted upon other trays, so that the tortillas may be cooked upon the other side. As the tortilla is composed of a material which is likely to stick to the trays, I provide the trays of flexible material, so that they may be bent, as shown in Fig. 6, such bending causing the tortillas to drop to the tray beneath them. When the tortillas are so inverted, the tray supporting them is introduced into the furnace again and the cooking completed. The trays, with the tortillas thereon, will then be removed from the furnace, and as each tray holds a predetermined number of tortillas it will readily be seen that the stacking and counting of them is thereby greatly facilitated. This latter feature is quite valuable in the commercial production of tortillas, as it will be readily understood that the stacking and counting of articles coming rapidly in single file is not only an arduous one, but one in which errors are very likely to occur. Furthermore, my improved system necessitates less handling of the tortillas than in the system above referred to.

What I claim is—

1. In an apparatus of the class described, the combination with a casing having an opening therein, of a cylindrical forming member mounted in said casing to revolve adjacent said opening, said member having a plurality of peripheral portions cut away, whereby in its revolution it will close individual portions of the said slot to form a plurality of corresponding openings therethrough, varying in size as the member revolves.

2. In an apparatus of the class described, the combination with a casing having a longitudinal slot therein and means for forcing plastic material therethrough, of a revoluble forming member mounted in said casing, comprising a cylinder having a plurality of cut-away portions, each cut-away portion proportionate to the size and shape of an object to be formed, whereby a plurality of objects will be simultaneously produced.

3. In an apparatus of the class described, the combination with a casing having a longitudinal opening or slot therein, and a cylindrical forming member mounted in said casing to revolve adjacent the opening, said member having a plurality of cut-away portions, each proportionate to the size and shape of the objects to be formed, a hood for said casing extending the length thereof and tapered inward from one end to the other, and means connected with the larger end of said hood for forcing plastic material therein, and thence into the casing and through the opening or slot therein.

4. In an apparatus of the class described, the combination with means for forming objects of plastic material and a traveling conveyer traveling beneath same, of a plurality of removable trays carried by said conveyer, arranged to receive the objects as they are produced, and mutilated gearing for intermittently driving the conveyer at an increased speed.

5. In an apparatus of the class described, the combination with means for forming objects of plastic material and a traveling conveyer traveling beneath same, of a plurality of removable trays carried by said conveyer, arranged to receive the objects as they are produced, said trays arranged to be spaced apart upon the conveyer, and mutilated gearing comprising gear-sectors of different diameters for driving the conveyer at an increased speed during the time the space between the trays is beneath the forming means.

6. In an apparatus of the class described, the combination with means for forming objects of plastic material and a traveling conveyer traveling beneath same, of a plurality of removable trays carried by said conveyer arranged to receive the objects as they are produced, and means timed with relation to the position of the trays upon the carrier with respect to the forming means, for intermittently driving the conveyer at an increased speed.

VICTOR M. BRASCHI.

Witnesses:
GRAHAM M. KER,
GEO. H. BEDWELL.